Patented Jan. 28, 1936

2,028,898

UNITED STATES PATENT OFFICE 2,028,898

PROCESS FOR THE PURIFICATION OF CAUSTIC SODA SOLUTIONS

Raymon E. Vander Cook, Inkster, and Alexander M. Lawson, Trenton, Mich., assignors to Pennsylvania Salt Manufacturing Company, Philadelphia, Pa., a corporation of Pennsylvania No Drawing. Application April 27, 1935, Serial No. 18,692

12 Claims. (Cl. 23—184)

The present invention relates to a process for use in conjunction with the purification of concentrated caustic soda solutions, and more particularly it relates to an improved process for the treatment of the complex salt formed during the purification of concentrated caustic soda solutions by the addition thereto of sodium sulphate.

A process for the purification of caustic soda solutions is described and claimed in United States Letters Patent No. 1,838,886, granted November 22, 1932. The process there disclosed involves the addition of sodium sulphate, or a compound forming sodium sulphate, to concentrated caustic soda solutions in order to form with the sodium chloride a complex salt substantially insoluble in the caustic soda solution, which salt contains sodium sulphate, sodium chloride, and caustic soda.

A process for the treatment of the complex salt by which the sodium sulphate may be recovered for reuse in the purification process is described and claimed in United States Letters Patent No. 1,998,471, granted April 23, 1935. In accordance with the process of that application, the complex salt is treated with a selective solvent which dissolves sodium chloride and caustic soda therefrom, leaving at least a portion of the sodium sulphate undissolved. The undissolved sodium sulphate is separated from the solution and is available for use in the purification of additional amounts of caustic soda solution. Preferably, the treatment of the complex salt is carried out at a temperature above 34° C., and sufficient water is employed as the selective solvent to furnish a solution containing between 16% and 26% caustic soda.

The process of the present invention is an improvement of the process described and claimed in Patent No. 1,998,471, and provides a method by which the accumulation of an undesirable amount of sodium carbonate and foreign, insoluble materials in the complex salt and recovered sodium sulphate may be avoided. In large scale use of the process of the application, it is not practical to take the elaborate precautions necessary to exclude the air entirely from the system, and, therefore, carbon dioxide is absorbed by the solutions and sodium carbonate is formed. It has been found that, at times, the complex salt contains an appreciable amount of sodium carbonate, particularly when the sodium sulphate used in the purification has been recycled a number of times. In addition to sodium carbonate, there is often also sufficient accumulated foreign insoluble material present, such as the oxide and hydrate of iron to impair the efficiency of the process. These materials and the sodium carbonate interfere with the formation of the most desirable type of complex salt. The complex salt is rendered difficult to filter because of its slimy nature and the tendency of the caustic solution to adhere thereto. The salt is also fine and not clearly defined and hence a relatively large amount of suspended solids is found in the filtrate.

The presence of sodium carbonate also requires the use of additional amounts of sodium sulphate to obtain the same separation of sodium chloride from the solution, due to a reaction between the sodium carbonate and sodium sulphate which renders the sodium sulphate unavailable for formation of the insoluble complex salt with the sodium chloride. For example, with a normal amount of carbonate in the complex salt, not exceeding 2%, the use of 3 parts of sodium sulphate for each part of sodium chloride in the solution will give a purified caustic liquor. However, when the carbonate content in the complex salt has been built up 10% to 12%, 8 to 10 parts of sodium sulphate are required for each part of sodium chloride in the solution to obtain a purified liquor of equivalent grade. This additional amount of sodium sulphate, not only represents an undesirable excess, but it places a burden on the entire system, materially reducing the capacity of the plant. An additional load is placed on the filters, and more caustic soda remains with the complex salt which results in higher evaporation costs in the recovery of the caustic soda.

The principal object of the present invention, therefore, is to provide a process for the treatment of the complex salt by which the sodium carbonate and other foreign materials are removed from the system while at the same time a high recovery of the sodium sulphate of the complex salt is obtained. Other objects will be apparent from a consideration of the specification and claims.

The process of the present invention is economical and expedient to carry out and may be employed in conjunction with any process for the purification of concentrated caustic soda solutions where the complex salt is formed. The term "concentrated caustic soda solutions" as employed herein includes those solutions whose concentrations are such that the complex salt formed upon the addition of sodium sulphate will be substantially insoluble therein. Solutions of caustic soda containing 36% to 39% $Na_2O$ (by weight) which have been evaporated to this concentration from lower concentration and from which the impurities, such as sodium chloride, as far as possible, have been removed, are preferably employed. To these solutions, sodium sulphate, preferably anhydrous, or a compound forming sodium sulphate with the caustic soda, is added in appropriate amounts. The amount of sodium sulphate supplied to the concentrated caustic soda solution to be purified is dependent upon the amount of sodium chloride in the solution to be removed therefrom in the form of the complex salt whose formula appears to be $NaOH \cdot NaCl \cdot Na_2SO_4$, although the ratio of the individual components in the complex salt may vary slightly from this formula, for example, it may be $$4NaOH \cdot 4NaCl \cdot 5Na_2SO_4.$$

Taking the first formula as typical, it will be seen that the minimum amount required when complete removal is desired is 2.43 parts of sodium sulphate for each part of sodium chloride in the solution. In some cases, it may be desirable to remove only part of the sodium chloride in the caustic soda solution, in which case the complex salt formed will be dependent on the amount of sodium sulphate added under the theoretical ratio. If sodium sulphate is added in amounts in excess of the theoretical ratio, the sodium chloride will be substantially completely removed. Often it is desirable from an operating standpoint to employ three to four parts of sodium sulphate to each part of sodium chloride in the solution. As previously pointed out, when sodium carbonate is present, it is necessary to increase the amount of sodium sulphate accordingly. The complex salt is formed upon the addition of the sodium sulphate, and in order to complete the reaction, it is desirable that the sodium sulphate and the solution remain in contact, preferably with agitation, for a period of time, for example, one hour or more. The factors of temperature, time, and the type and amount of agitation may be varied, and a particularly economical process is described and claimed in Patent No. 1,998,471. The crystalline complex salt which is substantially insoluble in the concentrated caustic soda solution is removed therefrom by filtering, or by setting and decantation, preferably the former, in which case a rotary vacuum filter is advantageously employed.

The complex salt removed from the concentrated caustic soda solution is treated in accordance with the process of the present invention to recover the sodium sulphate therefrom and to remove the excess of sodium carbonate and insoluble foreign materials from the recovered sodium sulphate.

The process of the present invention contemplates the treatment of the recovered sodium sulphate with sulphuric acid which reacts with the sodium carbonate forming additional amounts of sodium sulphate, and the use of the solution formed as the selective solvent in the recovery of sodium sulphate from the complex salt. Preferably, the recovered sodium sulphate to be reacted with sulphuric acid is dissolved in sufficient water to form an approximately saturated solution, and sufficient sulphuric acid is added thereto to bring the solution to approximate neutrality. The amount of acid added, however, will be determined by the results desired, and an acid solution may be formed if desired, although in most instances the solution will be neutral or slightly alkaline since the addition of an acid solution to the complex salt will destroy the caustic soda accompanying the salt which will otherwise be recovered in the evaporators. Relatively pure sulphuric acid may be employed, or a spent or reclaimed acid may be used if it contains no detrimental impurities. Preferably an acid of at least 75% $H_2SO_4$ content is added because of the dilution factor. However, a more dilute acid is applicable so long as a sufficiently concentrated sodium sulphate solution is obtained.

The ratio of the acid-treated solution to the complex salt will depend on the amount of carbonate in the system, the reduction of carbonate desired in the system, and the initial ratio of sodium sulphate to sodium chloride employed. In preferable operation, the concentration of the solution is such that when the solution comes in contact with the complex salt, sodium sulphate is precipitated from the solution, the largest amount of precipitated salt being obtained when a saturated solution is employed. The acid-treated solution is preferably filtered before it is brought into contact with the complex salt in order to remove the iron hydrate, dirt, or slime-forming materials which tend to accumulate and deleteriously affect the filtration. The solution is added in such proportions with respect to its concentration and the amount of complex salt to be treated that sodium chloride is to some extent at least dissolved therefrom, leaving at least some of the sodium sulphate of the complex salt undissolved. Preferably, the factors are adjusted to give the maximum solubility of the sodium chloride while providing minimum solubility of the sodium sulphate, although it will be understood that the process is of value even though some sodium sulphate remains in solution.

The complex salt, in addition to having caustic soda as one component, contains caustic soda solution adsorbed thereby since it is not practical to remove the last traces of adhering caustic soda. The concentration of caustic soda in the solution obtained after treatment with the acid-treated solution of the recovered sodium sulphate has been found to afford a means of control for determining the efficiency of the separation of the sodium chloride from the sodium sulphate. The caustic soda solution itself materially affects the solubilities of the two salts which it is desired to separate and may, therefore, be considered as aiding in the separation. The maximum solubility of the sodium chloride with the minimum solubility of the sodium sulphate is obtained when the concentration of the final solution resulting from the treatment of the complex salt with the acid-treated solution is about 21% NaOH. In general, the economic limits will be found to be between 16% NaOH and 26% NaOH, although the invention is not limited to those most desirable conditions. The lower the concentration of caustic soda in the solution below the optimum, the greater will be the loss of sodium sulphate, while on the other hand the higher the concentration above the optimum the greater will be the contamination of the sodium sulphate by sodium chloride.

The treatment of the complex salt with the acid-treated solution is preferably carried out at a temperature above that at which Glauber's salt is formed, for example a temperature of 34° C. or higher. The complex salt and the solution are advantageously mixed or agitated for a period of fifteen to twenty minutes. The mixing may be accomplished in a vertical mixer equipped with an agitating device, or in a horizontal mixer where the solution and complex salt are continuously added at one end and the solution and sodium sulphate constantly overflow at the opposite end. In this case, the capacity of the mixer is such that the materials will remain therein for the required time. The sodium sulphate is separated from the solution by any suitable apparatus such as a vertical settling tank, or more preferably by a rotary vacuum filter. The solution may be returned to evaporators for concentration and the recovered sodium sulphate is available for use in the purification of additional amounts of caustic soda solution.

In an example of the process for the purification of concentrated caustic soda solutions where the complex salt is separated continuously from the purified solution, 8400 pounds per hour of concentrated caustic soda solution containing 775 grams per litre of NaOH and 17 grams per litre of NaCl is reacted with 323 pounds of anhydrous sodium sulphate per hour. After the reaction has taken place and the crystalline product removed from the solution, a liquor is obtained containing 760 grams per litre of NaOH and 6 grams per litre of NaCl and Na$_2$SO$_4$ combined. The moist solids, comprising the complex salt, removed from the solution average 800 pounds per hour and these are treated with a selective solvent to recover the sodium sulphate therefrom. At the start of the process, the sodium sulphate may be recovered by the treatment of the complex salt with the approximate amount of water, for example the 800 pounds per hour of complex salt obtained as described may be mixed with 600 pounds of water per hour, as set forth in Patent No. 1,998,471.

When a supply of sodium sulphate has been recovered, the process of the present invention is followed, and the sodium sulphate solution to be employed as the selective solvent is prepared by dissolving the necessary amount of sodium sulphate in water to form an approximately saturated solution, substantially neutralizing the solution and removing the insoluble material by filtration. In practice, it has been found that only a small portion of the recovered sulphate need be dissolved and neutralized in order to keep the sodium carbonate in the system at the desired low point. That portion which is not treated is used directly in the purification of the concentrated caustic soda solutions. It will be clear that a process is provided in which the amount of recovered sodium sulphate dissolved and used in the treatment of the complex salt determines the carbonate content of the system.

In a typical case, 40% of the sodium sulphate recovered from the complex salt (approximately 115 pounds thereof) is dissolved in sufficient water to form a saturated solution. Sulphuric acid is added to this solution in the amount necessary to give a substantially neutral solution which is then filtered to remove the insoluble materials. The solution is then brought into contact with untreated complex salt, the ratio being approximately 125 pounds of the solution to 100 pounds of the complex salt. The mixture is agitated for fifteen or twenty minutes. The sodium sulphate which has been precipitated from the solution and the sodium sulphate of the complex salt which remains undissolved are separated from the solution which has a caustic soda concentration of approximately 21%. The separation of the recovered sodium sulphate into two portions may be continuous or intermittent over short periods of time or if the product is of even composition, it may all be dissolved for forty minutes and then all used in the purification process for sixty minutes. The figure 40% given may be varied as desired since with the use of a higher percentage the sodium carbonate of the system may be maintained lower, or with the use of a lower percentage there will be more carbonate present with the sodium sulphate.

By the process, the treatment with the sulphuric acid may be applied continuously, thus maintaining a constant condition which will reflect itself in less variable operating conditions with more definite control, reduced labor costs of recovery, and lowered sulphate requirements. The amount of caustic returned to the evaporators is reduced and a better finished product with less suspended solids is obtained. The process furnishes a balanced system in which the sulphate made from the carbonate and caustic will equal approximately that lost in the purified solution and through the recovery of the complex salt.

Considerable modification is possible in the steps of the process without departing from the essential features of the invention.

We claim:

1. In the process of purifying concentrated caustic soda solutions involving the addition of sodium sulphate thereto to form a substantially insoluble complex salt with sodium chloride and caustic soda, the removal of the complex salt from the solution and the recovery of sodium sulphate therefrom; the steps to prevent an accumulation of sodium carbonate in the system which comprise dissolving recovered sodium sulphate in water; adding sulphuric acid thereto; treating the complex salt with said solution to dissolve sodium chloride and caustic soda therefrom, leaving at least a portion of the sodium sulphate undissolved; separating the undissolved sodium sulphate from the solution; and thereafter reusing at least a portion of the recovered sodium sulphate in the process for the purification of further amounts of caustic soda solution.

2. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving recovered sodium sulphate in water; adding sulphuric acid thereto to form a substantially neutral solution; filtering said solution to remove the insoluble materials; treating the complex salt with said solution to dissolve sodium chloride and caustic soda therefrom, leaving at least a portion of the sodium sulphate undissolved; separating the undissolved sodium sulphate from the solution; and thereafter reusing at least a portion of the recovered sodium sulphate in the process for the purification of further amounts of caustic soda solution.

3. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving recovered sodium sulphate in water to form a substantially saturated solution; adding sulphuric acid thereto; filtering said solution to remove the insoluble materials; treating the complex salt with said solution to dissolve sodium chloride and caustic soda therefrom; separating the undissolved sodium sulphate from the solution; and thereafter re-using at least a portion of the recovered sodium sulphate in the process for the purification of further amounts of caustic soda solution.

4. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate in the system which comprise dissolving recovered sodium sulphate in water to form a substantially saturated solution; adding sulphuric acid thereto to form a substantially neutral solution; treating the complex salt with said solution to dissolve sodium chloride and caustic soda therefrom, leaving at least a portion of the sodium sulphate undissolved; separating the undissolved sodium sulphate from the solution; and thereafter re-using at least a portion of the recovered sodium sulphate in the process for the purification of further amounts of caustic soda solution.

5. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt with said solution to dissolve sodium chloride and caustic soda therefrom, leaving at least a portion of the sodium sulphate undissolved; separating the undissolved sodium sulphate from the solution; and thereafter re-using at least a portion of the recovered sodium sulphate in the process for the purification of further amounts of caustic soda solution.

6. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom, the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt at a temperature above 34° C. with said solution to dissolve sodium chloride and caustic soda therefrom, leaving at least a portion of the sodium sulphate undissolved; separating the undissolved sodium sulphate from the solution; and thereafter re-using at least a portion of the recovered sodium sulphate in the process for the purification of further amounts of caustic soda solution.

7. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate in the system which comprise dissolving a portion of the recovered sodium sulphate in water to form a substantially saturated solution; adding sulphuric acid thereto to form a substantially neutral solution; treating the complex salt with said solution in such amounts that the sodium chloride and caustic soda are substantially completely dissolved therefrom without dissolving an appreciable amount of sodium sulphate; separating the undissolved sodium sulphate from the solution; and thereafter reusing at least a portion of the recovered sodium sulphate in the process for the purification of further amounts of caustic soda solution.

8. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate in the system which comprise dissolving a portion of the recovered sodium sulphate in water to form a substantially saturated solution; adding sulphuric acid thereto to form a substantially neutral solution; treating the complex salt at a temperature above 34° C. with said solution in such amounts that the sodium chloride and caustic soda are substantially completely dissolved therefrom without dissolving an appreciable amount of sodium sulphate; separating the undissolved sodium sulphate from the solution; and thereafter re-using at least a portion of the recovered sodium sulphate in the process for the purification of further amounts of caustic soda solution.

9. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt at a temperature above 34° C. with said solution in such amounts that the sodium chloride and caustic soda are substantially completely dissolved therefrom without dissolving an appreciable amount of sodium sulphate; separating the undissolved sodium sulphate from the solution; and thereafter re-using at least a portion of the recovered sodium sulphate in the process for the purification of further amounts of caustic soda solution.

10. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt at a temperature above 34° C. with said solution in such amounts that the solution obtained is between 16% and 26% caustic soda to dissolve sodium chloride and caustic soda therefrom, leaving at least a portion of the sodium sulphate undissolved; separating the undissolved sodium sulphate from the solution; and thereafter re-using at least a portion of the recovered sodium sulphate in the process for the purification of further amounts of caustic soda solution.

11. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt at a temperature above 34° C. with said solution in such amounts that the solution obtained is in the neighborhood of 21% caustic soda to dissolve sodium chloride and caustic soda therefrom, leaving at least a portion of the sodium sulphate undissolved; separating the undissolved sodium sulphate from the solution; and thereafter re-using at least a portion of the recovered sodium sulphate in the process for the purification of further amounts of caustic soda solution.

12. In the process of purifying concentrated caustic soda solutions involving the addition of sodium sulphate thereto to form a substantially insoluble complex salt with sodium chloride and caustic soda, the removal of the complex salt from the solution and the recovery of the sodium sulphate therefrom; the steps to prevent an accumulation of sodium carbonate and insoluble slime-forming ingredients in the system which comprise dissolving a portion of the recovered sodium sulphate in water to form a substantially saturated solution; adding sulphuric acid thereto to form a substantially neutral solution; filtering said solution to remove the insoluble materials; treating the complex salt at a temperature above 34° C. with said solution in such amounts that the sodium chloride and caustic soda are substantially completely dissolved therefrom without dissolving an appreciable amount of sodium sulphate; separating the undissolved sodium sulphate from the solution; and thereafter re-using at least a portion of the recovered sodium sulphate in the process for the purification of further amounts of caustic soda solution; the ratio of sodium sulphate employed in the treatment of the complex salt to the sodium sulphate re-used in the purification process being in the nighborhood of 40 to 60.

RAYMON E. VANDER COOK.
ALEXANDER M. LAWSON.